US011706660B2

(12) United States Patent
Damnjanovic et al.

(10) Patent No.: US 11,706,660 B2
(45) Date of Patent: Jul. 18, 2023

(54) SIDELINK AND UU LINK BUFFER STATUS REPORT

(71) Applicant: QUALCOMM Incorporated, San Diego, CA (US)

(72) Inventors: Jelena Damnjanovic, Del Mar, CA (US); Tao Luo, San Diego, CA (US); Junyi Li, Franklin Park, NJ (US); Juan Montojo, San Diego, CA (US); Sony Akkarakaran, Poway, CA (US); Ozcan Ozturk, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 65 days.

(21) Appl. No.: 17/301,748

(22) Filed: Apr. 13, 2021

(65) Prior Publication Data
US 2021/0329489 A1 Oct. 21, 2021

Related U.S. Application Data

(60) Provisional application No. 63/012,385, filed on Apr. 20, 2020.

(51) Int. Cl.
H04W 28/02 (2009.01)
H04L 12/24 (2006.01)
(Continued)

(52) U.S. Cl.
CPC ..... *H04W 28/0278* (2013.01); *H04L 41/0803* (2013.01); *H04W 92/18* (2013.01)

(58) Field of Classification Search
None
See application file for complete search history.

(56) References Cited

U.S. PATENT DOCUMENTS

2016/0044707 A1* 2/2016 Folke ................ H04W 72/1284
370/329
2016/0183241 A1* 6/2016 Lee .................... H04W 56/0015
455/425
(Continued)

FOREIGN PATENT DOCUMENTS

WO    WO-2016163762 A1    10/2016

OTHER PUBLICATIONS

International Search Report and Written Opinion—PCT/US2021/070391 -ISA/EPO—dated Jul. 30, 2021.
(Continued)

Primary Examiner — Hong Shao
(74) Attorney, Agent, or Firm — Harrity & Harrity, LLP

(57) ABSTRACT

Various aspects of the present disclosure generally relate to wireless communication. In some aspects, a first user equipment (UE) may receive a configuration for buffer status reporting associated with a sidelink between the first UE and a second UE and a link between the first UE and a base station; generate a buffer status report (BSR) based at least in part on the configuration, wherein the BSR includes buffer reporting information for one or more logical channels on the sidelink between the first UE and the second UE, and buffer reporting information for one or more logical channels on the link between the first UE and the base station; and provide the BSR to the base station. Numerous other aspects are provided.

30 Claims, 5 Drawing Sheets

(51) Int. Cl.
  *H04L 41/0803*  (2022.01)
  *H04W 92/18*  (2009.01)

(56) References Cited

U.S. PATENT DOCUMENTS

2020/0029353 A1\*  1/2020  Xu .................... H04W 52/0209
2022/0174774 A1\*  6/2022  Tseng ................ H04W 72/1263

OTHER PUBLICATIONS

Mediatek Inc: "Prioritization Between NR-UL and NR-SL", 3GPP TSG-RAN WG2 Meeting #107Bis, 3GPP Draft, R2-1913235 Prioritization Between NR UL and NR SL, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, 4 Pages, Oct. 4, 2019 (Oct. 4, 2019), XP051804920, Retrieved from the Internet: URL: https://ftp.3gpp.org/tsg_ran/WG2_RL2/TSGR2_107bis/Docs/R2-1913235.zip R2-1913235 Prioritization between NR UL and NR SL.docx [retrieved on Oct. 4, 2019] the whole document.

Xiaomi: "Discussion on BSR Prioritization", 3GPP TSG-RAN WG2 Meeting #107bis, 3GPP Draft, R2-1912806, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 2, 2019 (Oct. 2, 2019), 3 Pages, XP051803692, Retrieved from the Internet: URL: https://ftp.3gpp.org/tsg_ran/WG2_RL2/TSGR2_107bis/Docs/R2-1912806.zip R2-1912806.doc [retrieved on Oct. 2, 2019] the whole document.

\* cited by examiner

SIDELINK AND UU LINK BUFFER STATUS REPORT

CROSS-REFERENCE TO RELATED APPLICATION

This patent application claims priority to U.S. Provisional Patent Application No. 63/012,385, filed on Apr. 20, 2020, entitled "JOINT SIDELINK AND UU LINK BUFFER STATUS REPORT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink and Uu link buffer status reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first UE, may include receiving a configuration for buffer status reporting associated with a sidelink between the first UE and a second UE and a link between the first UE and a base station; generating a buffer status report (BSR) based at least in part on the configuration, wherein the BSR includes buffer reporting information for one or more logical channels on the sidelink between the first UE and the second UE and buffer reporting information for one or more logical channels on the link between the first UE and the base station; and transmitting the BSR to the base station.

In some aspects, a method of wireless communication, performed by a base station, may include determining a configuration for buffer status reporting associated with a sidelink between a first UE and a second UE and a link between the first UE and the base station; providing the configuration to the first UE; and receiving a BSR after providing the configuration, wherein the BSR includes buffer reporting information for one or more logical channels on the sidelink between the first UE and the second UE and buffer reporting information for one or more logical channels on the link between the first UE and the base station.

In some aspects, a first UE for wireless communication may include a memory and one or more processors coupled to the memory. The memory and the one or more processors may be configured to receive a configuration for buffer status reporting associated with a sidelink between the first UE and a second UE and a link between the first UE and a base station; generate a BSR based at least in part on the configuration, wherein the BSR includes buffer reporting information for one or more logical channels on the sidelink between the first UE and the second UE and buffer reporting information for one or more logical channels on the link between the first UE and the base station; and transmit the BSR to the base station.

In some aspects, a base station for wireless communication may include a memory and one or more processors coupled to the memory. The memory and the one or more processors may be configured to determine a configuration for buffer status reporting associated with a sidelink between a first UE and a second UE and a link between the first UE and the base station; provide the configuration to the first UE; and receive a BSR after providing the configuration, wherein the BSR includes buffer reporting information for one or more logical channels on the sidelink between the first UE and the second UE and buffer reporting information for one or more logical channels on the link between the first UE and the base station.

In some aspects, a non-transitory computer-readable medium may store one or more instructions for wireless communication. The one or more instructions, when executed by one or more processors of a first UE, may cause the one or more processors to receive a configuration for buffer status reporting associated with a sidelink between the first UE and a second UE and a link between the first UE and a base station; generate a BSR based at least in part on the configuration, wherein the BSR includes buffer reporting information for one or more logical channels on the sidelink between the first UE and the second UE and buffer reporting information for one or more logical channels on the link between the first UE and the base station; and transmit the BSR to the base station.

In some aspects, a non-transitory computer-readable medium may store one or more instructions for wireless communication. The one or more instructions, when executed by one or more processors of a base station, may cause the one or more processors to determine a configuration for buffer status reporting associated with a sidelink between a first UE and a second UE and a link between the first UE and the base station; provide the configuration to the first UE; and receive a BSR after providing the configuration, wherein the BSR includes buffer reporting information for one or more logical channels on the sidelink between the first UE and the second UE and buffer reporting information for one or more logical channels on the link between the first UE and the base station.

In some aspects, an apparatus for wireless communication may include means for receiving a configuration for buffer status reporting associated with a sidelink between the apparatus and a UE and a link between the apparatus and a base station; means for generating a BSR based at least in part on the configuration, wherein the BSR includes buffer reporting information for one or more logical channels on the sidelink between the apparatus and the UE and buffer reporting information for one or more logical channels on the link between the apparatus and the base station; and means for transmitting the BSR to the base station.

In some aspects, an apparatus for wireless communication may include means for determining a configuration for buffer status reporting associated with a sidelink between a first UE and a second UE and a link between the first UE and the apparatus; means for providing the configuration to the first UE; and means for receiving a BSR after providing the configuration, wherein the BSR includes buffer reporting information for one or more logical channels on the sidelink between the first UE and the second UE and buffer reporting information for one or more logical channels on the link between the first UE and the apparatus.

Aspects generally include a method, apparatus, system, computer program product, non-transitory computer-readable medium, user equipment, base station, wireless communication device, and/or processing system as substantially described herein with reference to and as illustrated by the drawing and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
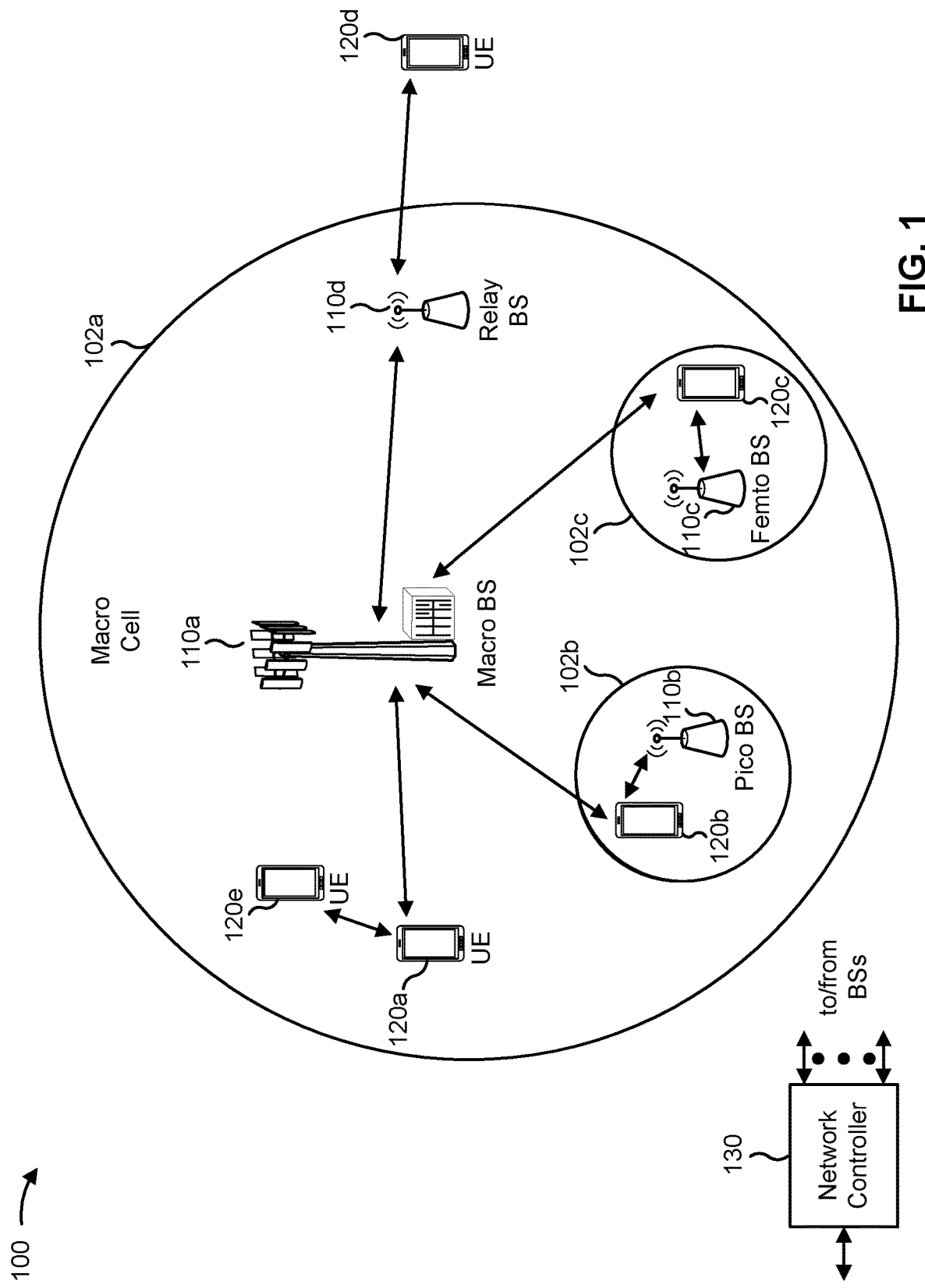
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
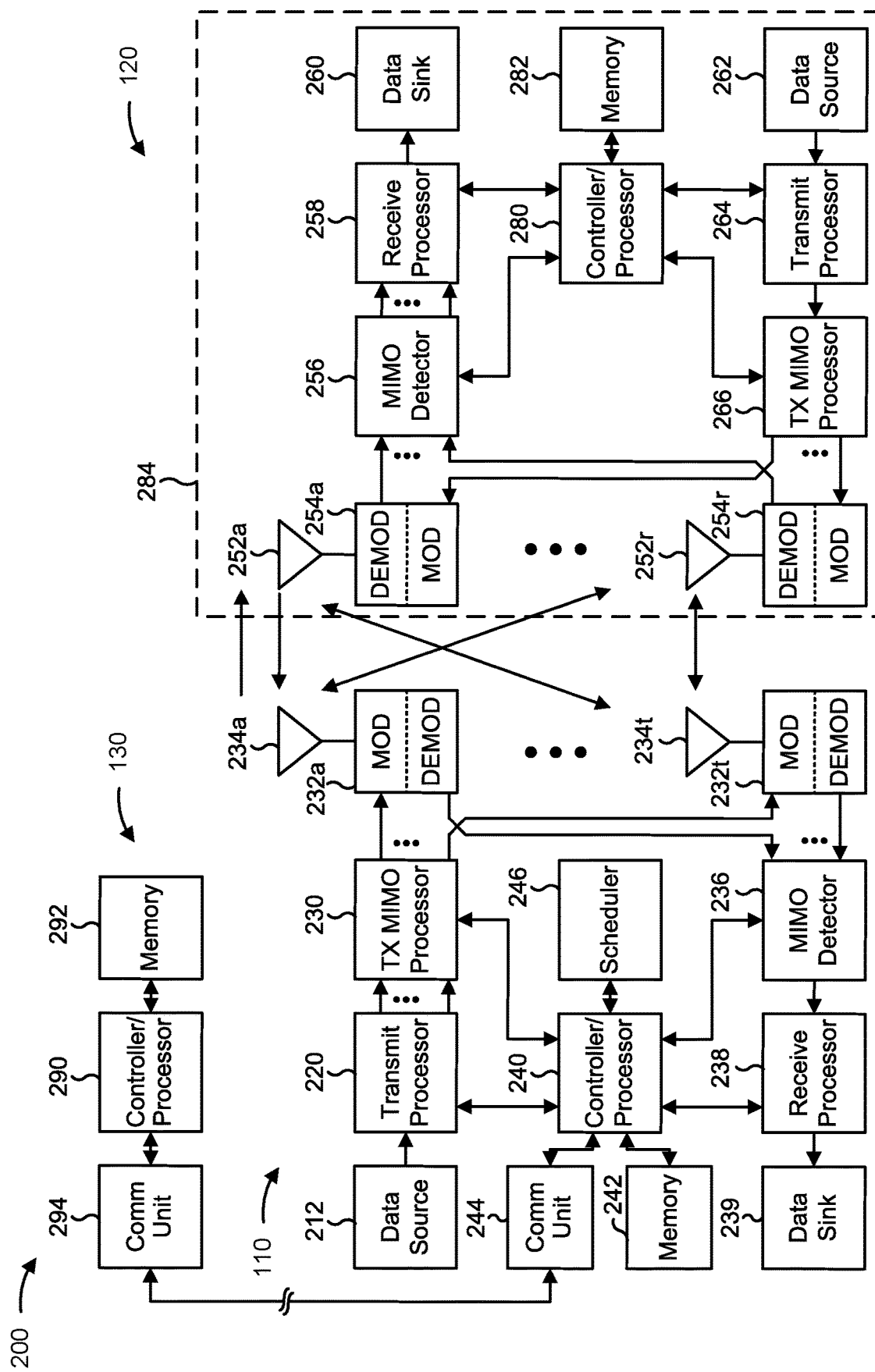
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with sidelink and Uu link buffer status reporting, as described in more detail elsewhere herein. For example, controller/processor 240 of base station 110, controller/processor 280 of UE 120, and/or any other component(s) of FIG. 2 may perform or direct operations of, for example, process 4 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 4 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a first UE 120 may include means for receiving a configuration for buffer status reporting associated with a sidelink between the first UE 120 and a second UE 120 and a link between the first UE 120 and a base station 110; means for generating a buffer status report (BSR) based at least in part on the configuration, wherein the BSR includes buffer reporting information for one or more logical channels on the sidelink between the first UE 120 and the second UE 120 and buffer reporting information for one or more logical channels on the link between the first UE 120 and the base station 110; means for transmitting the BSR to the base station and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a configuration for buffer status reporting associated with a sidelink between a first UE 120 and a second UE 120 and a link between the first UE 120 and the base station 110; means for providing the configuration to at least one of the first UE 120 or the second UE 120; means for receiving a BSR after providing the configuration, wherein the BSR includes buffer reporting information for one or more logical channels on the sidelink between the first UE 120 and the second UE 120 and buffer reporting information for one or more logical channels on the link between the first UE 120 and the base station 110; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A relay UE is a UE that acts as a relay between another UE and a base station, meaning that the relay UE can forward communications from the other UE to the base station and/or can forward communications from the base station to the other UE. In one example scenario, a first UE (e.g., a first UE 120) may be configured to communicate with a base station (e.g., a base station 110) on a link over a Uu interface (herein referred to as a Uu link), and a second UE (e.g., a second UE 120) may be configured to communicate with the base station on another Uu link. Further, the first and second UEs may also be configured to communicate directly with one another on a link over a PC5 interface (herein referred to as a sidelink). In one example, the second UE may act as a relay UE for the first UE, meaning that the second UE can forward communications from the first UE to the base station and/or forward communications from the base station to the first UE.

A relay UE can be used to provide link diversity. Taking the above scenario as an example, the second UE may be configured to act as a relay UE for the first UE in order to provide link diversity (e.g., link selection, link aggregation, or the like) for communications between the first UE and the base station. Link diversity can improve performance in a scenario when the Uu link between the first UE and the base station can be impaired or blocked on a short time scale, such as when the Uu link uses frequency range 2 (FR2). In some cases, link selection and/or link aggregation enabled by a relay UE is facilitated by configuring the base station to provide control associated with the relay operation. For example, the base station may be configured to schedule communications on the Uu link between the first UE and the base station, communications on the Uu link between the second UE and the base station, and communications on the sidelink between the first and second UEs (e.g., one at the time or simultaneously). In some cases, UE relay operation is performed at Layer 2 (L2) (e.g., a protocol stack for UE relay on the sidelink may go up a radio link control (RLC) layer such that a packet data convergence protocol (PDCP) layer is end-to-end between the first UE and the base station).

In general, buffer status reporting for a Uu link includes providing a buffer status report (BSR) associated with the Uu link using a particular medium access control control element (MAC-CE) format (e.g., a format defined for providing BSRs associated with Uu links). The BSR associated with the Uu is provided on the Uu link to the base station. Buffer status reporting for a sidelink typically includes providing a BSR associated with the sidelink using another particular MAC-CE format (e.g., a format defined for providing BSRs associated with sidelinks). That is, separate MAC-CEs are needed to provide a BSR associated with a Uu link and a BSR associated with a sidelink.

In some scenarios, communications on a Uu link between a UE and a base station and communications on a sidelink between the UE and another UE are not independent of one another. A scenario in which the sidelink is used for UE relay operation is one such scenario (e.g., since communications on the Uu link between the UE and the base station are related to communications on the sidelink between the UE and the relay UE). In such a scenario, it is desirable to enable a BSR associated with a sidelink and a BSR associated with a Uu link to be provided in a same MAC-CE to, for example, reduce overhead, conserve network resources, reduce complexity at the base station in association with providing UE relay control, and/or the like.

Some aspects described herein provide techniques and apparatuses for sidelink and Uu link buffer status reporting. In some aspects, a base station may determine a configuration for buffer status reporting associated with a sidelink between a first UE and a second UE and a Uu link between the first UE and the base station, and may provide the configuration to the first UE. Here, the first UE may receive the configuration and generate and transmit a BSR based at least in part on the configuration. The BSR may include buffer reporting information for one or more logical channels on the sidelink and buffer reporting information for one or more logical channels on the Uu link. Additional details are provided below.

Figure 3:
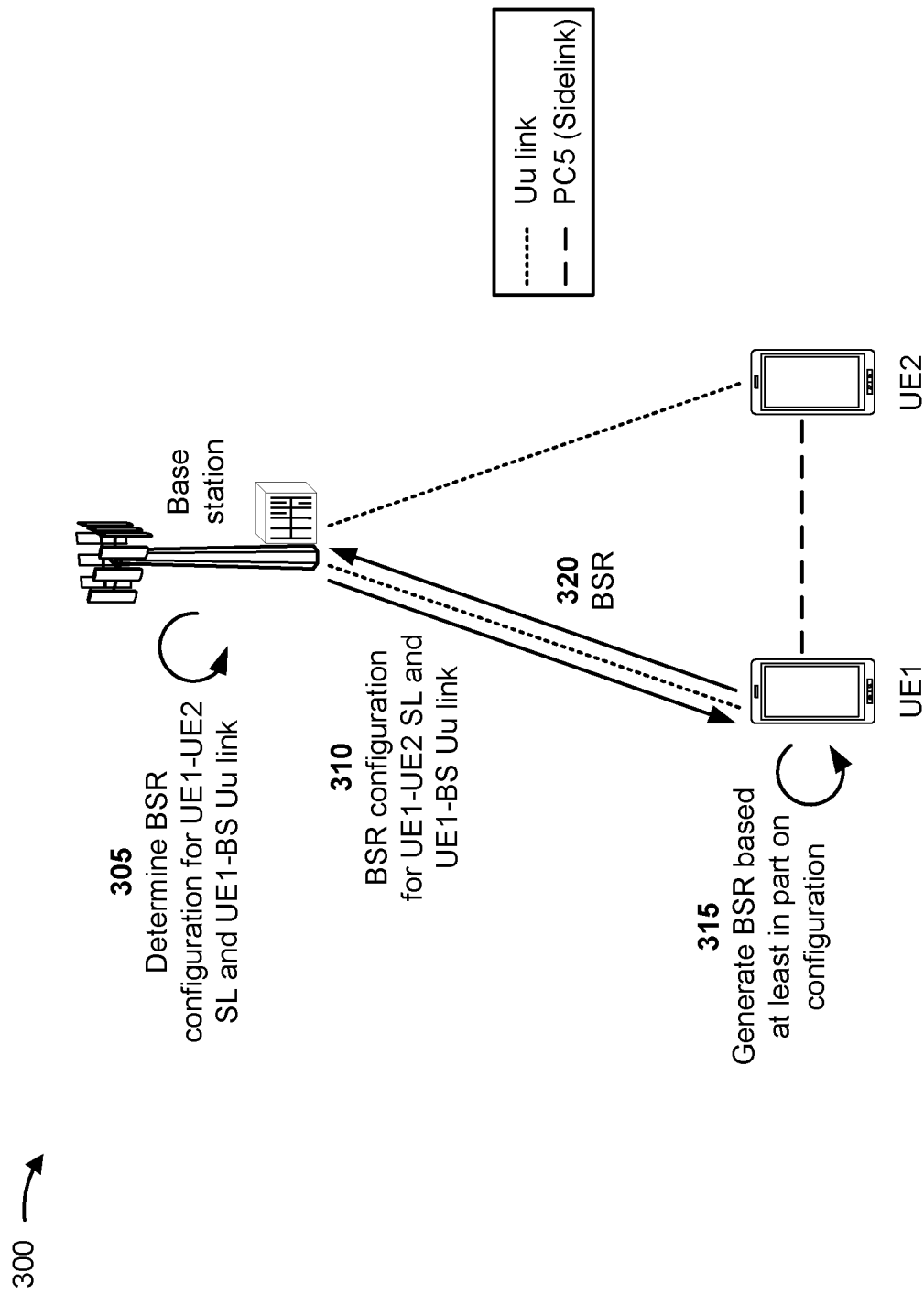
FIG. 3 is a diagram illustrating an example associated with sidelink and Uu link buffer status reporting, in accordance with the present disclosure.

FIG. 3 is a diagram illustrating an example 300 of sidelink and Uu link buffer status reporting, in accordance with the present disclosure. In example 300, a first UE (e.g., a first UE 120, identified as UE1) is configured to communicate with a base station (e.g., a base station 110) on a Uu link, and a second UE (e.g., a second UE 120, identified as UE2) is configured to communicate with the base station on another Uu link. Further, the first and second UEs are configured to communicate directly with one another on a sidelink. In example 300, the second UE is to act as a relay UE for the first UE, meaning that the second UE is to forward communications to/from the first UE from/to the base station. Notably, in another example, the first UE may be configured to act as a relay UE for the second UE, meaning that the first UE would be configured to forward communications to/from the second UE from/to the base station.

As shown by reference 305, the base station may determine a configuration for buffer status reporting associated with the sidelink (i.e., the link between the first UE and the second UE) and the Uu link (i.e., the link between the first UE and the base station). In some aspects, the configuration may include an indication that a BSR is to be used for buffer status reporting for the sidelink and the Uu link (i.e., that the same BSR is to be used for buffer status reporting for both the sidelink and the Uu link). In some aspects, such a report may be referred to as a joint BSR. In some aspects, the configuration may include information indicating a manner in which the BSR is to be generated, formatted, and/or provided by the first UE.

As shown by reference 310, the base station may provide, and the first UE may receive, the configuration for buffer status reporting associated with the sidelink and the Uu link. In some aspects, the base station may provide, and the UE may receive, the configuration via radio resource control (RRC) signaling.

As indicated by references 315, the first UE may generate a BSR based at least in part on the configuration and, as shown by reference 320, may transmit the BSR to the base station. In some aspects, the BSR may include buffer reporting information for one or more logical channels on the sidelink and buffer reporting information for one or more logical channels on the Uu link. In some aspects, the first UE may transmit, and the base station may receive, the BSR in a MAC-CE.

In some aspects, the BSR includes information indicating an entry of the BSR that includes the buffer reporting information for the one or more logical channels on the sidelink. That is, in some aspects, the BSR MAC-CE may include a field to indicate that an entry of the BSR is associated with the sidelink.

In some aspects, the BSR includes information indicating one or more logical channel indices in association with providing the buffer reporting information for the one or more logical channels on the sidelink. That is, the BSR may include information indicating one or more logical channel indices, where the one or more logical channel indices indicate the buffer reporting information for the one or more logical channels on the sidelink. In such a case, the UE may be configured (e.g., based at least in part on the configuration provided by the base station) with information indicating the one or more logical channel indices as logical channel indices to be used for providing buffer reporting information for logical channels on the sidelink only. That is, the base station may configure (e.g., via RRC signaling) one or more logical channel indices to be used exclusively for the sidelink, meaning the one or more logical channel indices cannot be used in association with providing buffer status reporting information associated with the Uu link. In such a case, an explicit indication of the buffer reporting information associated with the sidelink need not be included in the BSR.

In some aspects, the BSR includes information indicating a logical channel group to be used for providing buffer reporting information for the one or more logical channels on the sidelink. That is, the BSR may include information indicating a logical channel group, where the logical channel group indicates the buffer reporting information for the one or more logical channels on the sidelink. In such a case, the UE may be configured (e.g., based at least in part on the configuration provided by the base station) with information indicating the logical channel group as a logical channel group to be used for providing buffer reporting information for logical channels on the sidelink. That is, the base station may configure (e.g., via RRC signaling) a logical channel group to be used exclusively for the sidelink, meaning the logical channel group cannot be used in association with providing buffer status reporting information associated with the Uu link. In such a case, an explicit indication of the buffer reporting information associated with the sidelink need not be included in the BSR.

As indicated above, FIG. 3 is provided as an example. Other examples may differ from what is described with respect to FIG. 3.

Figure 4:
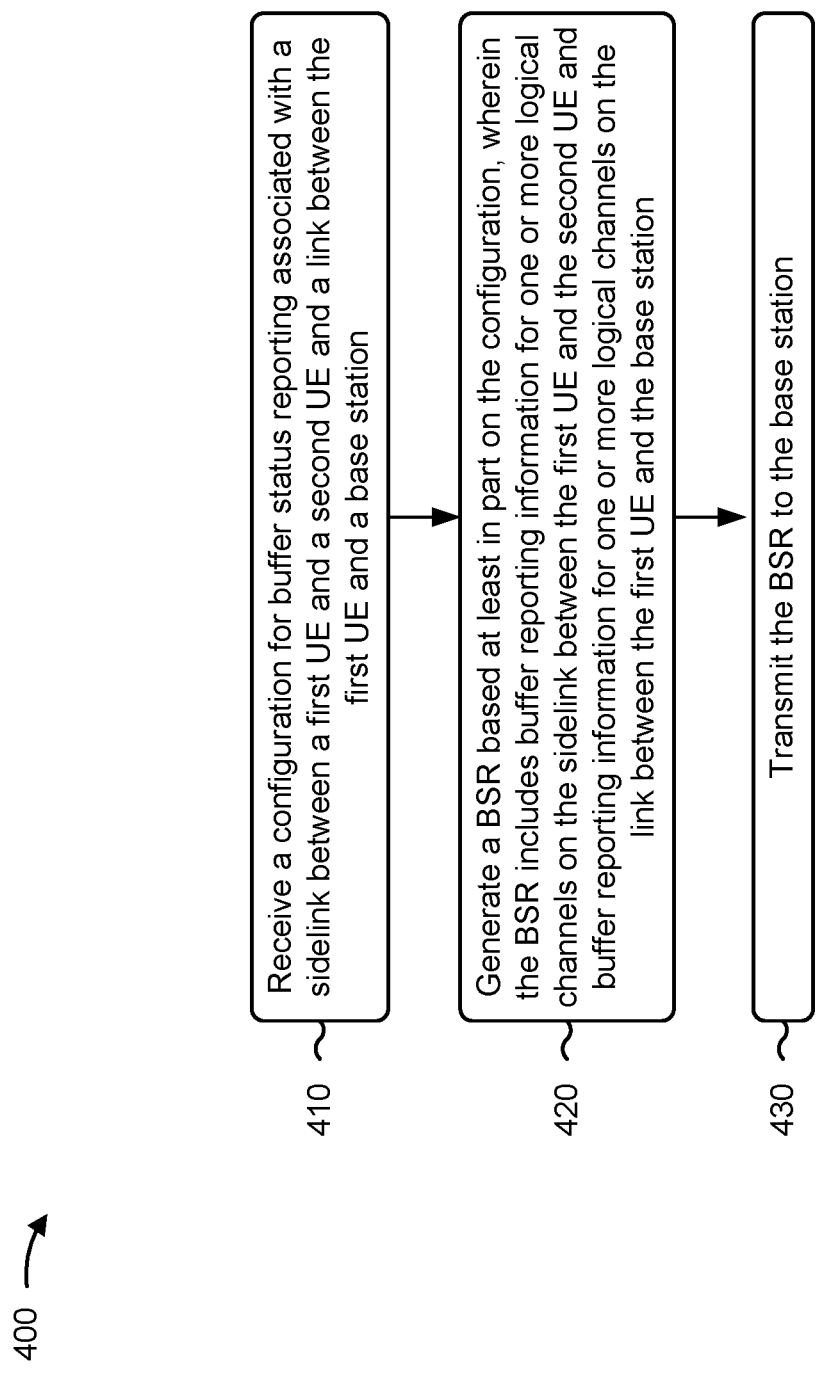
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with sidelink and Uu link buffer status reporting.

As shown in FIG. 4, in some aspects, process 400 may include receiving a configuration for buffer status reporting associated with a sidelink between the first UE and a second UE and a link between the first UE and a base station (block 410). For example, the UE (e.g., using receive processor 258, controller/processor 280, memory 282, and/or the like)

may receive a configuration for buffer status reporting associated with a sidelink between the first UE and a second UE (e.g., a second UE 120) and a link between the first UE and a base station (e.g., a base station 110), as described above.

As further shown in FIG. 4, in some aspects, process 400 may include generating a BSR based at least in part on the configuration, wherein the BSR includes buffer reporting information for one or more logical channels on the sidelink between the first UE and the second UE and buffer reporting information for one or more logical channels on the link between the first UE and the base station (block 420). For example, the UE (e.g., using receive processor 258, transmit processor 264, controller/processor 280, memory 282, and/or the like) may generate a BSR based at least in part on the configuration, as described above. In some aspects, the BSR includes buffer reporting information for one or more logical channels on the sidelink between the first UE and the second UE and buffer reporting information for one or more logical channels on the link between the first UE and the base station.

As further shown in FIG. 4, in some aspects, process 400 may include transmitting the BSR to the base station (block 430). For example, the UE (e.g., using transmit processor 264, controller/processor 280, memory 282, and/or the like) may transmit the BSR to the base station, as described above.

Process 400 may include additional aspects, such as any single aspect or any combination of aspects described below and/or in connection with one or more other processes described elsewhere herein.

In a first aspect, the configuration is received via radio resource control signaling.

In a second aspect, alone or in combination with the first aspect, the BSR is transmitted in a medium access control control element.

In a third aspect, alone or in combination with one or more of the first and second aspects, the BSR includes information indicating an entry of the BSR that includes the buffer reporting information for the one or more logical channels on the sidelink.

In a fourth aspect, alone or in combination with one or more of the first through third aspects, the configuration includes information indicating one or more logical channel indices to be used for providing buffer reporting information for logical channels on the sidelink only.

In a fifth aspect, alone or in combination with one or more of the first through fourth aspects, the BSR includes information indicating the one or more logical channel indices in association with providing the buffer reporting information for the one or more logical channels on the sidelink.

In a sixth aspect, alone or in combination with one or more of the first through fifth aspects, the configuration includes information indicating a logical channel group to be used for providing buffer reporting information for logical channels on the sidelink only.

In a seventh aspect, alone or in combination with one or more of the first through sixth aspects, the BSR includes information indicating the logical channel group in association with providing the buffer reporting information for the one or more logical channels on the sidelink.

In an eighth aspect, alone or in combination with one or more of the first through seventh aspects, either the first UE or the second UE is a relay UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
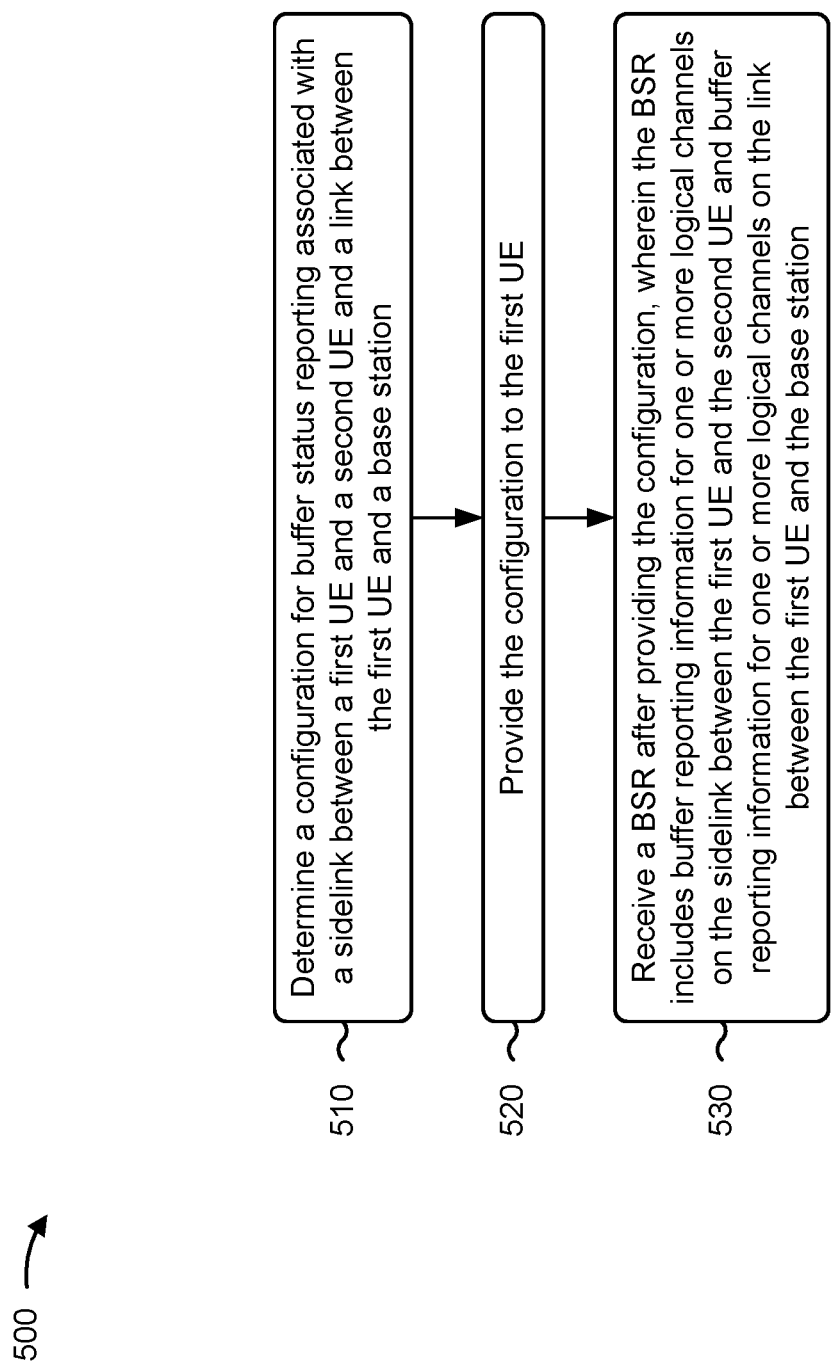
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110 and/or the like) performs operations associated with sidelink and Uu link buffer status reporting.

As shown in FIG. 5, in some aspects, process 500 may include determining a configuration for buffer status reporting associated with a sidelink between a first UE and a second UE and a link between the first UE and the base station (block 510). For example, the base station (e.g., using transmit processor 220, receive processor 238, controller/processor 240, memory 242, and/or the like) may determine a configuration for buffer status reporting associated with a sidelink between a first UE (e.g., a first UE 120) and a second UE (e.g., a second UE 120) and a link between the first UE and the base station, as described above.

As further shown in FIG. 5, in some aspects, process 500 may include providing the configuration to the first UE (block 520). For example, the base station (e.g., using transmit processor 220, controller/processor 240, memory 242, and/or the like) may provide the configuration to the first UE, as described above.

As further shown in FIG. 5, in some aspects, process 500 may include receiving a BSR after providing the configuration, wherein the BSR includes buffer reporting information for one or more logical channels on the sidelink between the first UE and the second UE and buffer reporting information for one or more logical channels on the link between the first UE and the base station (block 530). For example, the base station (e.g., using receive processor 238, controller/processor 240, memory 242, and/or the like) may receive a BSR after providing the configuration, as described above. In some aspects, the BSR includes buffer reporting information for one or more logical channels on the sidelink between the first UE and the second UE and buffer reporting information for one or more logical channels on the link between the first UE and the base station.

Process 500 may include additional aspects, such as any single aspect or any combination of aspects described below and/or in connection with one or more other processes described elsewhere herein.

In a first aspect, the configuration is provided via radio resource control signaling.

In a second aspect, alone or in combination with the first aspect, the BSR is received in a medium access control control element.

In a third aspect, alone or in combination with one or more of the first and second aspects, the BSR includes information indicating an entry of the BSR that includes the buffer reporting information for the one or more logical channels on the sidelink.

In a fourth aspect, alone or in combination with one or more of the first through third aspects, the configuration includes information indicating one or more logical channel indices to be used for providing buffer reporting information for logical channels on the sidelink only.

In a fifth aspect, alone or in combination with one or more of the first through fourth aspects, the BSR includes information indicating the one or more logical channel indices in association with providing the buffer reporting information for the one or more logical channels on the sidelink.

In a sixth aspect, alone or in combination with one or more of the first through fifth aspects, the configuration includes information indicating a logical channel group to be used for providing buffer reporting information for logical channels on the sidelink only.

In a seventh aspect, alone or in combination with one or more of the first through sixth aspects, the BSR includes information indicating the logical channel group in association with providing the buffer reporting information for the one or more logical channels on the sidelink.

In an eighth aspect, alone or in combination with one or more of the first through seventh aspects, either the first UE or the second UE is a relay UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a first user equipment (UE), comprising: receiving a configuration for buffer status reporting associated with a sidelink between the first UE and a second UE and a link between the first UE and a base station; generating a buffer status report (BSR) based at least in part on the configuration, wherein the BSR includes buffer reporting information for one or more logical channels on the sidelink between the first UE and the second UE and buffer reporting information for one or more logical channels on the link between the first UE and the base station; and transmitting the BSR to the base station.

Aspect 2: The method of Aspect 1, wherein the configuration is received via radio resource control signaling.

Aspect 3: The method of any of Aspects 1-2, wherein the BSR is transmitted in a medium access control control element (MAC-CE).

Aspect 4: The method of any of Aspects 1-3 wherein the BSR includes information indicating an entry of the BSR that includes the buffer reporting information for the one or more logical channels on the sidelink.

Aspect 5: The method of any of Aspects 1-4, wherein the configuration includes information indicating one or more logical channel indices to be used for providing buffer reporting information for logical channels on the sidelink only.

Aspect 6: The method of Aspect 5, wherein the BSR includes information indicating the one or more logical channel indices in association with providing the buffer reporting information for the one or more logical channels on the sidelink.

Aspect 7: The method of any of Aspects 1-6, wherein the configuration includes information indicating a logical channel group to be used for providing buffer reporting information for logical channels on the sidelink only.

Aspect 8: The method of Aspect 7, wherein the BSR includes information indicating the logical channel group in association with providing the buffer reporting information for the one or more logical channels on the sidelink.

Aspect 9: The method of any of Aspects 1-8, wherein either the first UE or the second UE is a relay UE.

Aspect 10: A method of wireless communication performed by a base station, comprising: determining a configuration for buffer status reporting associated with a sidelink between a first user equipment (UE) and a second UE and a link between the first UE and the base station; providing the configuration to the first UE; and receiving a buffer status report (BSR) after providing the configuration, wherein the BSR includes buffer reporting information for one or more logical channels on the sidelink between the first UE and the second UE and buffer reporting information for one or more logical channels on the link between the first UE and the base station.

Aspect 11: The method of Aspect 10, wherein the configuration is provided via radio resource control signaling.

Aspect 12: The method of any of Aspects 10-11, wherein the BSR is received in a medium access control control element (MAC-CE).

Aspect 13: The method of any of Aspects 10-12, wherein the BSR includes information indicating an entry of the BSR that includes the buffer reporting information for the one or more logical channels on the sidelink.

Aspect 14: The method of any of Aspects 10-13, wherein the configuration includes information indicating one or more logical channel indices to be used for providing buffer reporting information for logical channels on the sidelink only.

Aspect 15: The method of Aspect 14, wherein the BSR includes information indicating the one or more logical channel indices in association with providing the buffer reporting information for the one or more logical channels on the sidelink.

Aspect 16: The method of any of Aspects 10-15, wherein the configuration includes information indicating a logical channel group to be used for providing buffer reporting information for logical channels on the sidelink only.

Aspect 17: The method of Aspect 16, wherein the BSR includes information indicating the logical channel group in association with providing the buffer reporting information for the one or more logical channels on the sidelink.

Aspect 18: The method of any of Aspects 10-17, wherein either the first UE or the second UE is a relay UE.

Aspect 19: An apparatus for wireless communication at a device, comprising a processor; memory coupled with the processor; and instructions stored in the memory and executable by the processor to cause the apparatus to perform the method of one or more Aspects of Aspects 1-9.

Aspect 20: A device for wireless communication, comprising a memory and one or more processors coupled to the memory, the memory and the one or more processors configured to perform the method of one or more Aspects of Aspects 1-9.

Aspect 21: An apparatus for wireless communication, comprising at least one means for performing the method of one or more Aspects of Aspects 1-9.

Aspect 22: A non-transitory computer-readable medium storing code for wireless communication, the code comprising instructions executable by a processor to perform the method of one or more Aspects of Aspects 1-9.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 24: An apparatus for wireless communication at a device, comprising a processor; memory coupled with the processor; and instructions stored in the memory and executable by the processor to cause the apparatus to perform the method of one or more Aspects of Aspects 10-18.

Aspect 25: A device for wireless communication, comprising a memory and one or more processors coupled to the memory, the memory and the one or more processors configured to perform the method of one or more Aspects of Aspects 10-18.

Aspect 26: An apparatus for wireless communication, comprising at least one means for performing the method of one or more Aspects of Aspects 10-18.

Aspect 27: A non-transitory computer-readable medium storing code for wireless communication, the code comprising instructions executable by a processor to perform the method of one or more Aspects of Aspects 10-18.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
    receiving a configuration providing an indication that a joint buffer status report (BSR) is to be used for buffer status reporting for a sidelink between the first UE and a second UE and a link between the first UE and a network node;
    generating the joint BSR based at least in part on the configuration,
        wherein the joint BSR includes buffer reporting information for one or more logical channels on the sidelink between the first UE and the second UE and buffer reporting information for one or more logical channels on the link between the first UE and the network node; and
    transmitting the joint BSR to the network node,
        wherein the joint BSR includes a field indicating an entry of the joint BSR that includes the buffer reporting information for the one or more logical channels on the sidelink.

2. The method of claim 1, wherein the configuration is received via radio resource control signaling.

3. The method of claim 1, wherein the joint BSR is transmitted in a medium access control control element (MAC-CE).

4. The method of claim 1, wherein the configuration includes information indicating one or more logical channel indices to be used for providing the buffer reporting information for the one or more logical channels on the sidelink only.

5. The method of claim 4, wherein the joint BSR includes information indicating the one or more logical channel indices in association with providing the buffer reporting information for the one or more logical channels on the sidelink.

6. The method of claim 1, wherein the configuration includes information indicating a logical channel group to be used for providing the buffer reporting information for the one or more logical channels on the sidelink only.

7. The method of claim 6, wherein the joint BSR includes information indicating the logical channel group in association with providing the buffer reporting information for the one or more logical channels on the sidelink.

8. The method of claim 1, wherein either the first UE or the second UE is a relay UE.

9. A method of wireless communication performed by a network node, comprising:
    determining a configuration providing an indication that a joint buffer status report (BSR) is to be used for buffer status reporting for a sidelink between a first user equipment (UE) and a second UE and a link between the first UE and the network node;
providing the configuration to the first UE; and
receiving the joint BSR after providing the configuration,
  wherein the joint BSR includes buffer reporting information for one or more logical channels on the sidelink between the first UE and the second UE and buffer reporting information for one or more logical channels on the link between the first UE and the network node, and
  wherein the joint BSR includes a field indicating an entry of the joint BSR that includes the buffer reporting information for the one or more logical channels on the sidelink.

10. The method of claim 9, wherein the configuration is provided via radio resource control signaling.

11. The method of claim 9, wherein the joint BSR is received in a medium access control control element (MAC-CE).

12. The method of claim 9, wherein the configuration includes information indicating one or more logical channel indices to be used for providing the buffer reporting information for the one or more logical channels on the sidelink only.

13. The method of claim 12, wherein the joint BSR includes information indicating the one or more logical channel indices in association with providing the buffer reporting information for the one or more logical channels on the sidelink.

14. The method of claim 9, wherein the configuration includes information indicating a logical channel group to be used for providing the buffer reporting information for the one or more logical channels on the sidelink only.

15. The method of claim 14, wherein the joint BSR includes information indicating the logical channel group in association with providing the buffer reporting information for the one or more logical channels on the sidelink.

16. The method of claim 9, wherein either the first UE or the second UE is a relay UE.

17. A first user equipment (UE) for wireless communication, comprising:
a memory; and
one or more processors coupled to the memory, the one or more processors configured to:
  receive a configuration providing an indication that a joint buffer status report (BSR) is to be used for buffer status reporting for a sidelink between the first UE and a second UE and a link between the first UE and a network node;
  generate the joint BSR based at least in part on the configuration,
    wherein the joint BSR includes buffer reporting information for one or more logical channels on the sidelink between the first UE and the second UE and buffer reporting information for one or more logical channels on the link between the first UE and the network node; and
  transmit the joint BSR to the network node,
    wherein the joint BSR includes a field indicating an entry of the joint BSR that includes the buffer reporting information for the one or more logical channels on the sidelink.

18. The first UE of claim 17, wherein the configuration is received via radio resource control signaling.

19. The first UE of claim 17, wherein the joint BSR is transmitted in a medium access control control element (MAC-CE).

20. The first UE of claim 17, wherein the configuration includes information indicating one or more logical channel indices to be used for providing the buffer reporting information for the one or more logical channels on the sidelink only.

21. The first UE of claim 17, wherein the configuration includes information indicating a logical channel group to be used for providing the buffer reporting information for the one or more logical channels on the sidelink only.

22. The first UE of claim 17, wherein the second UE is configured to communicate with the network node.

23. A network node for wireless communication, comprising:
a memory; and
one or more processors coupled to the memory, the one or more processors configured to:
  determine a configuration providing an indication that a joint buffer status report (BSR) is to be used for buffer status reporting for a sidelink between a first user equipment (UE) and a second UE and a link between the first UE and the network node;
  provide the configuration to the first UE; and
  receive the joint BSR after providing the configuration,
    wherein the joint BSR includes buffer reporting information for one or more logical channels on the sidelink between the first UE and the second UE and buffer reporting information for one or more logical channels on the link between the first UE and the network node, and
    wherein the joint BSR includes a field indicating an entry of the joint BSR that includes the buffer reporting information for the one or more logical channels on the sidelink.

24. The network node of claim 23, wherein the configuration is provided via radio resource control signaling.

25. The network node of claim 23, wherein the joint BSR is received in a medium access control control element (MAC-CE).

26. The network node of claim 23, wherein the configuration includes information indicating one or more logical channel indices to be used for providing the buffer reporting information for the one or more logical channels on the sidelink only.

27. The network node of claim 23, wherein the configuration includes information indicating a logical channel group to be used for providing the buffer reporting information for the one or more logical channels on the sidelink only.

28. The method of claim 1, wherein the second UE is configured to communicate with the network node.

29. The method of claim 9, wherein the second UE is configured to communicate with the network node.

30. The network node of claim 23, wherein the second UE is configured to communicate with the network node.

* * * * *